United States Patent [19]

Saunders et al.

[11] 4,241,101

[45] Dec. 23, 1980

[54] LOW DISSIPATION FACTOR EPOXY COATING POWDER

[75] Inventors: Howard E. Saunders, Pittsburgh; James D. B. Smith, Wilkens Township, Allegheny County, both of Pa.

[73] Assignee: Westinghouse Electric Corp., Pittsburgh, Pa.

[21] Appl. No.: 39,919

[22] Filed: May 17, 1979

[51] Int. Cl.$^3$ .................... C08G 59/42; C08G 59/68
[52] U.S. Cl. ................... 427/32; 260/37 EP; 427/120; 427/185; 427/195; 528/92; 528/104; 528/112
[58] Field of Search .............. 260/37 EP, 830 TW; 528/92, 112, 104; 427/32, 185, 195; 525/114

[56] References Cited

U.S. PATENT DOCUMENTS

| | | | |
|---|---|---|---|
| 3,244,670 | 4/1966 | Puchala et al. | 260/47 |
| 3,344,096 | 9/1967 | Manasia et al. | 260/18 |
| 3,400,098 | 9/1968 | Parry | 260/37 |
| 3,477,971 | 11/1969 | Allen et al. | 260/18 |
| 3,506,598 | 4/1970 | Groff et al. | 260/2 |
| 4,009,223 | 2/1977 | Noonan | 260/830 TW |
| 4,040,993 | 8/1977 | Elbling et al. | 260/18 EP |

*Primary Examiner*—Earl A. Nielsen
*Attorney, Agent, or Firm*—R. D. Fuerle

[57] ABSTRACT

A coating powder is disclosed which is prepared from a solventless non-aqueous composition of a solid epoxy resin having an epoxy equivalent weight of about 400 to about 8000, a Durran's softening point of at least 70°, a solid polyanhydride curing agent at least about 50 mole % of which is trimellitic anhydride, and a cross-linking agent having the general formula $R_3SnX$ where each R is selected from alkyl, aryl, aralkyl, and alkaryl up to $C_{20}$ and X is selected from acetate, propionate, butyrate, halogen, and hydroxyl. The composition is dry-blended and then melt-mixed at 50° to 150° C. To prepare the coating powder, it is then cooled, crushed, and ground to a particle size of less than 100 microns. The coating powder is electrostatically applied to a conductor and is cured above the melting point of the resin.

16 Claims, No Drawings

LOW DISSIPATION FACTOR EPOXY COATING POWDER

U.S. Pat. No. 4,040,993 describes what is perhaps the best commercial coating powder now in use. That coating powder has excellent electrical properties including a very low dissipation factor. However, coatings made with the powder do not retain heat shock for several months. The heat shock test is performed by bending a wire coated with the powder around a mandrel which is about five times the diameter of the thickness of the wire. The bent wire is placed in an oven at 175° C. for a half hour then removed and allowed to cool to room temperature and is observed for cracks. Coatings made with powders as described in U.S. Pat. No. 4,040,993 pass this test if tested shortly after coating, but do not pass the test if tested several months after coating. Since the coated wires are used in transformers which have an expected life of about 20 years, failure of the coating to pass this heat shock test was considered a severe commercial limitation.

PRIOR ART

U.S. Pat. No. 4,040,993 discloses a coating powder made by hot melt mixing the composition of a diglycidyl ether of bisphenol A, a pre-prepared epoxy ester, and a curing agent containing trimellitic anhydride. The use of organo-tin compounds is not disclosed.

U.S. Pat. No. 4,009,223 discloses a coating powder made by preparing the composition of two different diglycidyl ethers of bisphenol A and a curing agent. No organo-tin compounds are used in the composition.

U.S. Pat. No. 3,506,598 discloses an epoxy coating powder containing a co-catalyst of a metal salt of tin, zinc or lead carboxylate. Anhydrides can also be used in the composition.

British Pat. No. 971,525 discloses epoxy resins containing catechol and triphenol tin chloride.

SUMMARY OF THE INVENTION

We have discovered that a coating powder having electrical and physical properties comparable to that described in U.S. Pat. No. 4,040,993, but also having excellent heat shock over long periods of time, can be prepared from a solid epoxy resin, a polyanhydride curing agent containing trimellitic anhydride, and an organo-tin compound. Unlike many of the prior art compounds, our composition contains no partial ester of an epoxy, no Lewis acids such as $BF_3$, no water, and no solvent. The coating powder of this invention produces coatings which possess excellent electric strength, flexibility, and low dissipation factors at elevated temperatures and these properties are retained for prolonged periods of time.

DESCRIPTION OF THE INVENTION

The epoxy resin of this invention is a solid at room temperature, has an epoxy equivalent weight (EEW) of about 400 to about 8000, a Durran's softening point of at least about 70° C., and less than 30 hydroxyl groups per molecule. Epoxy resins having higher or lower or epoxy equivalent weights have been found to be unsatisfactory. The preferred epoxy equivalent weight range is about 750 to about 2000, and the preferred Durran's softening point is at least about 90° C. Epoxy resins having more than 30 hydroxyl groups per molecule have extremely high molecular weights which make them difficult to extrude; less than 20 hydroxyl groups per molecule is preferred. Bisphenol A epoxy resins are preferred because they produce coatings having the best properties.

About 5 to about 40 phr (parts by weight per 100 parts by weight of epoxy resin) of a curing agent must also be present. The curing agent is a solid polyanhydride such as pyromellitic dianhydride, polyazelaic polyanhydride or trimellitic anhydride (The term "polyanhydride" as used herein is intended to mean an anhydride of a compound having at least three carboxylic acid groups.). At least about 50 mole % of the curing agent must be trimellitic anhydride and preferably all of the curing agent is trimellitic anhydride. The amount of trimellitic anhydride in the composition should be at least 5 phr as less is ineffective, and the amount should not be more than 20 phr as more makes the coating too brittle and the dissipation factor too high. If another anhydride is used in addition to trimellitic anhydride the amount of the other anhydride is about 5 to about 20 phr for the same reasons.

The compositon also preferably contains about 0.01 to about 5 phr of an accelerator for the curing agent. If less than 0.01 phr is used the accelerator is ineffective and if more than about 5 phr is used premature gelation may occur. Suitable accelerators include stannous octoate, 2-methylimidazole, benzyl dimethylamine, 2-ethyl-4-methyl imidazole, and 1-methyl imidazole. The preferred accelerator is 2-methyl imidazole because it is easy to incorporate in the composition and gives about the right gelation time. Also preferred is an accelerator sold by Cordoba Chemical Company under the trade designation "Cordoba ATC-3," believed to be an organometallic compound in a hydrocarbon solvent. The preferred amount of accelerator is about 0.05 to about 2 phr.

The composition also contains about 0.01 to about 1 phr of a cross-linking agent. Less than 0.01 phr is ineffective and more than 1 phr is unnecessary and may adversely affect the storage stability of the composition. Preferably the amount of cross-linking agent is about 0.02 to about 0.05 phr. The cross-linking agent is an organo-tin salt having the general formula $R_3SnX$ where each R is independently selected from alkyl, aryl, aralkyl, and alkaryl up to $C_{20}$. Preferably the R group is from $C_4$ to $C_{10}$ because these compounds are readily available and more reactive. The X group is acetate, propionate, butyrate, halogen, hydroxyl, or hydroxide. Acetate and chloride are preferred because they give coatings with the best electrical properties and these compounds are readily available. Examples of suitable cross-linking agents include tribenzyl tin hydroxide, triphenyl tin chloride, triphenyl tin acetate, tributyl tin acetate, tributyl tin chloride, and tributyl tin hydroxide.

The composition also preferably contains about 0.01 to about 5 phr of an activator for said cross-linking agent. Less than 0.1 phr is ineffective and more than 5 phr lowers the storage stability and electrical properties. The preferred amount of activator is about 0.2 to about 2 phr. Suitable activators include catechol, pyrogallol, and phloroglucinol. Catechol is preferred as it has been found to be the most effective.

The composition also preferably contains about 0.2 to about 5 phr of a flow control agent. Less than 0.2 phr is ineffective and more than 5 phr is expensive and does not appreciably enhance the properties of the coating. The preferred amount of flow control agent is about 0.5 to about 3 phr. Suitable flow control agents include silicons, fluorocarbons, and "Modaflow," a polyacrylate sold by Monsanto. Polyacrylate flow control agents are preferred as they are relatively inexpensive and have been found to work very well.

The composition also preferably includes up to about 40 phr of a pigment or a dye. The preferable amount of pigment or dye is about 5 to about 20 phr. Suitable pigments and dyes include titanium dioxide, iron oxide, chromium oxide, cadmium oxide, phthalocyanine dyes.

The composition also preferably includes about 0.005 to about 5 phr of a thixotropic agent. Less than 0.05 phr of thixotropic agent is not effective and more than about 5 phr will make the composition too thick. The preferred amount of thixotropic agent is about 0.01 to about 2 phr. Suitable thixotropic agents include silica and various clays. Silica is preferred as it has been found to work the best.

The composition is dry blended and then melt mixed at about 50° to about 150° C. The melt mixing may be done in any suitable machine such as a two roll mill, but preferably a two zone extruder is used as it seems to produce the best powders. After melt mixing the composition is cooled, crushed, and ground to a particle size of less than about 100 microns to prepare the coating powder. The coating powder is applied electrostatically to any type of a conductor and it is especially suited for application to wires. Application may be made in electrostatic fluidized bed or with electrostatic gun or other electrostatic means, but electrostatic fluidized beds are most common. After application to the conductor the coating powder is fused and cured above the melting point of the particular resin used which will usually require a temperature of greater than 100° C. but less than 500° C.

The compositions of this invention contain no partial esters of epoxy resins, no Lewis acids such as $BF_3$, no water (i.e., less than 0.5% by weight), and no solvents (i.e., less than 2% by weight), because the inclusion of these substances has been found to decrease the desirable properties of the coating.

The following example further illustrates this invention.

EXAMPLE

The following compositions were prepared.

| Ingredients | 1 | 2 | 3 | 4 |
|---|---|---|---|---|
| Epoxy Resin, EEW 660–810 SP, 85°–95° C. | 10.46 | 10.73 | 11.46 | 10.82 |
| Epoxy Resin, EEW 1600–2000; SP, 127°–133° C. | 29.96 | 75.84 | 37.44 | 76.48 |
| Epoxy Resin, EEW 775–850; SP, 112°–120° C. | 26.98 | — | — | — |
| Partial Ester, EEW 1100–1500; SP, 90°–105° C. | 16.97 | — | — | — |
| Epoxy Resin, EEW 1800–2800; SP, — | — | — | 37.43 | — |
| Trimellitic Anhydride | 8.44 | 8.67 | 8.82 | 8.74 |
| Accelerator believed to be an organometallic compound in a hydrocarbon solvent sold by the Cordoba Chemical Co. under the trade designation "Cordoba ATC-3" | — | 0.43 | 0.44 | 0.44 |
| Tributyltin Acetate | — | — | — | 0.09 |
| Catechol | — | — | — | 0.87 |
| Pigments | 7.19 | 4.33 | 4.41 | 4.36 |

The compositions were dry blended then melt mixed at 50° and 100° C. in a two zone extruder. They were then cooled, crushed, and ground to a particle size of less than 100 microns. Rectangular aluminum wires 0.114 by 0.289 inches were coated with the powders in an electrostatic fluidized bed. The coatings were cured at 200° C. and stored at 40° C. The following table gives the results of tests performed on these coatings.

| Composition | Stroke Cure (sec) at 200° C. 3 Days Storage at 40° C. | | | 100 Tan δ 150° C. | Electric Strength (kV) | Heat Shocks, 0.5 hr. at 175° C. | | | | | | | |
|---|---|---|---|---|---|---|---|---|---|---|---|---|---|
| | | | | | | Initial | | 30 days | | 60 days | | 90 days | |
| | 0 | 14 | 28 | | | Flat | Edge | Flat | Edge | Flat | Edge | Flat | Edge |
| 1 | 51 | 31 | <25 | 1.6 | 1.0–4.6 | Pass | Pass | Pass | Pass | Pass | Pass | Fail | Fail |
| 2 | 37 | — | 36 | 40 | 1.4–2.0 | Pass | Pass | Pass | Pass | Pass | 1 Pass 1 Fail | 1 Pass 1 Fail | Pass |
| 3 | 19 | — | 16 | 54 | 0.7–1.4 | Pass | Pass | Pass | Pass | Pass | Pass Fail | 1 Pass 1 Fail | Pass |
| 4 | 37 | 27 | 29 | 10.5 | 1.2–2.6 | Pass | Pass | Pass | Pass | Pass | Pass | Pass | Pass |

The above table shows that compositions according to this invention retain heat shock for prolonged periods of time. Compositions 2 and 3, which do not contain the cross-linking agent and the activator for it, show heat shock failure after 60 days storage, but composition 4, which does contain the cross-linking agent and activator, still retains heat shock after 90 days storage. Composition 1, which contained a partial ester of an epoxy resin and a difunctional acid and does not contain a cross-linking agent and an activator, failed heat shock after 90 days storage.

We claim:

1. A solventless, non-aqueous composition which comprises (A) a solid bisphenol A epoxy resin having an EEW of about 400 to about 8000, a Durran's softening point of at least about 70° C., and less than 30 hydroxyl groups per molecule; (B) about 5 to 40 phr of a solid polyanhydride curing agent at least about 50 mole % of which is trimellitic anhydride; (C) about 0.01 to about 1 phr of a cross-linking agent having the general forma $R_3SnX$ where each R is independently selected from alkyl, aryl, aralkyl, and alkaryl up to $C_{20}$, and X is selected from acetate, propionate, butyrate, halogen, and hydroxy; (D) about 0.01 to about 5 phr of an accelerator for said curing agent; and (E) about 0.1 to about 5 phr of an activator for said cross-linking agent selected from the group consisting of catechol, pyrogallol, phloroglucinol, and mixtures thereof.

2. A composition according to claim 1 wherein said epoxy resin has an epoxy equivalent weight of about 750 to about 2000, a Durran's softening point of at least about 90° C., and less than 20 hydroxyl groups per molecule.

3. A composition according to claim 1 wherein said solid polyanhydride curing agent is 100 mole % trimellitic anhydride.

4. A composition according to claim 1 wherein said accelerator for said curing agent is 2-methyl imidazole.

5. A composition according to claim 1 wherein R is $C_4$ to $C_{10}$ and X is acetate.

6. A composition according to claim 1 wherein $R_3SnX$ is tributyl tin acetate.

7. A composition according to claim 1 wherein said activator for said cross-linking agent is catechol.

8. A composition according to claim 1 which includes about 0.2 to about 5 phr of a flow control agent.

9. A composition according to claim 8 wherein said flow agent is a polyacrylate.

10. A composition according to claim 1 which includes up to about 40 phr of a pigment or dye.

11. A composition according to claim 1 which includes 0.005 to about 5 phr of a thixotropic agent.

12. A composition according to claim 11 wherein said thixotropic agent is silica.

13. A method of preparing an electrostatic powder coating composition comprising dry blending a composition according to claim 1, melt mixing said composition at about 50° to about 150° C., cooling said composition, crushing said composition, and grinding said composition to a particle size of less than 100 microns.

14. An electrostatic coating composition prepared according to the method of claim 13.

15. A method of forming a coating on a conductor comprising electrostatically applying the electrostatic coating composition of claim 13 to a conductor and fusing and curing said composition above its melting point.

16. A solventless, non-aqueous composition which comprises
(A) a solid bisphenol A epoxy resin having an epoxy equivalent weight of about 750 to about 2000, a Durran's softening point of at least about 90° C., and less than 20 hydroxyl groups per molecule, (B) about 2.5 to about 20 phr of trimellitic anhydride,
(C) about 0.05 to about 2 phr of 2-methyl imidazole,
(D) about 0.02 to about 0.5 phr of a cross-linking agent having the general formula $R_3Sn-OCOCH_3$ where each R is independently selected from alkyl, aryl, arykyl and alkaryl from C4 to C10,
(E) about 0.2 to about 2 phr of catechol,
(F) about 0.5 to about 3 phr of a polyacrylate flow control agent,
(G) about 5 to about 20 phr of a pigment or a dye,
(H) about 0.01 to about 2 phr of a silica thixotropic agent.

* * * * *